Feb. 10, 1970   P. M. HENRY ET AL   3,494,696
EASEL FOR PHOTOCOPYING
Filed May 25, 1967
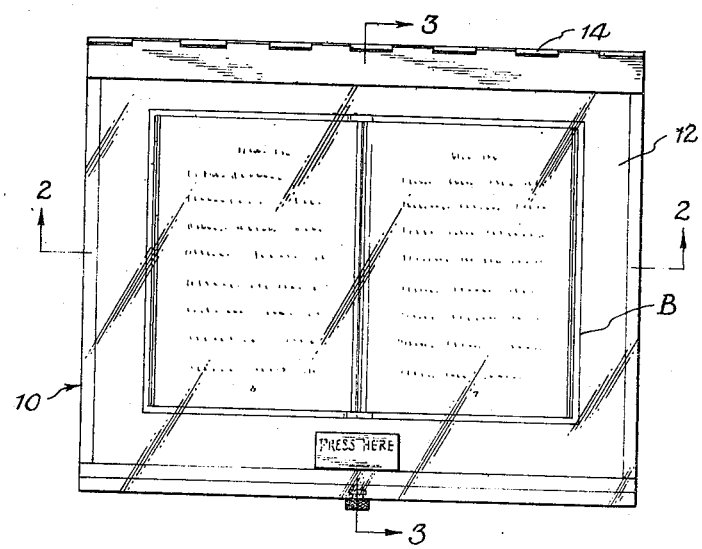
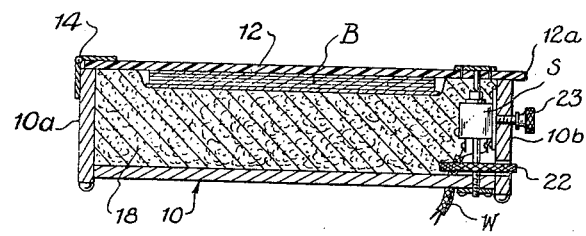
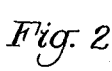
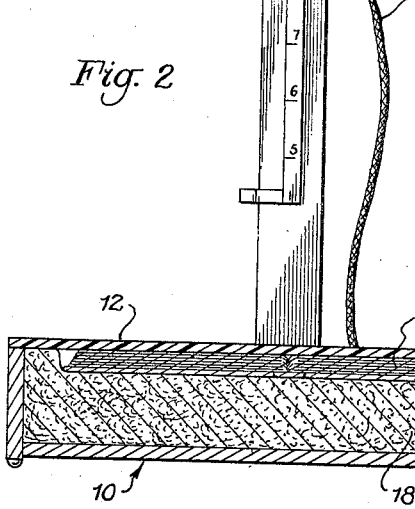
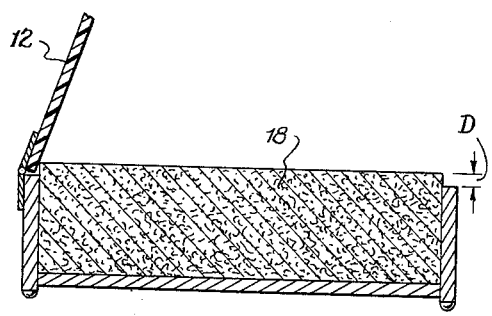
INVENTORS
Province M. Henry
Dye Ogata
BY Bailey, Stephens and Huettig
ATTORNEYS United States Patent Office 3,494,696
Patented Feb. 10, 1970

3,494,696
EASEL FOR PHOTOCOPYING
Province M. Henry, Taipei, Taiwan (Box 6, APO San Francisco, Calif. 96263), and Dye Ogata, 3309 Oberon St., Kensington, Md. 20795
Filed May 25, 1967, Ser. No. 641,255
Int. Cl. G03b 27/62
U.S. Cl. 355—71                    4 Claims

ABSTRACT OF THE DISCLOSURE

A box filled with elastic plastic foam and having a transparent cover is used as an easel for holding the copy to be photographed in focus with a camera. The copy is placed into the resilient foam and held flat and in focus by the transparent cover. A pin is mounted on the cover to actuate the microswitch, mounted on the box, upon complete closure of the cover. The plastic foam prevents complete closure of the cover until an external force is applied to it.

---

The invention relates to an easel for holding an article to be photographed in proper focus with a camera.

In making copies, different devices have been developed for holding the copy flat with respect to the taking material. For example, Collins, U.S. Patent No. 2,774,289, shows a blanket for holding a negative tightly against a printing paper and Hosterman, U.S. Patent No. 2,739,516, uses a vacuum for the same purpose. Ludwig, U.S. Patent No. 2,941,461, uses a urethane bed for pressing a sensitized paper against a page of a book. However, these devices need to be manipulated in numerous steps and are not adapted for the rapid copying, as by microfilming, of articles.

It is the object of this invention to produce an easel so that articles such as the printed pages of books, maps, single printed sheets, or the like can be quickly placed into position for being photographed by a camera such as being photographed on microfilm.

In general, these objects are obtained by forming an easel composed of a resilient foam material contained in a box having a transparent cover. The article to be copied is placed on the bed of foam material and then pressed down into the material by closing the cover. The top surface of the article is then held flat by the underside of the transparent cover and in substantially exact focus with the camera. A micro-switch is provided which is actuated when the cover is completely closed to snap the camera shutter.

The means by which the objects of the invention are obtained are described more fully with reference to the accompanying drawings, in which:

FIGURE 1 is a plan view of the easel;
FIGURE 2 is a cross-sectional view taken on the line 2—2 of FIGURE 1;
FIGURE 3 is a cross-sectional view taken on the line 3—3 of FIGURE 1 with the cover open; and
FIGURE 4 is a view similar to FIGURE 3 but with the cover shown in closed position.

The easel is composed of a rectangular box 10 having a transparent cover 12 connected by a piano-type hinge 14 to the back 10a of the box. This transparent cover is preferably composed of a methacrylate ester type polymer, such as is sold under the trade names of Lucite or Plexiglas. A plunger pin 16 is mounted on the front side portion of the cover 12. This cover is larger than the box so that it has a front edge portion 12a which overhangs the front side 10b of the box.

The box is filled with an elastic foam pad such as polyurethane plastic foam to form a copy bed 18. As shown in FIGURE 3, when the cover is open, this copy bed extends a distance D above the upper edge of the box 10.

Mounted on the inside of the front side of the box 10 is a micro-switch S which is connected by an electrical circuit indicated by the wires W to the operating mechanism for the shutter of a camera 20. The point of contact closure of the switch S is adjustable by the vernier screw wheel 22 and adjustment set screw 23, in order to make a fine adjustment to suit the final cover pressure needed to make the camera exposure of the copy being photographed.

In operation, the camera 20 is adjusted so that it is in focus forming the underside of the closed cover 12. With the cover open, an article such as an opened book B is placed on the copy bed and then the cover is closed. In closing, the cover presses the book into the copy bed and flattens the exposed pages. When the cover is finally closed and the pages fully flattened, the plunger pin 16 actuates the micro-switch S. This energizes the electrical circuit to the camera 20 and snaps the camera shutter to make the exposure.

At the same time, other camera mechanisms can be activated, such as a flash bulb, solenoid exposure counter, and/or means for automatically moving the camera reel to an unexposed frame for taking the next picture.

In a practical example, this easel has been used with an Eastman MRD II Recordak Microfile camera. The easel can be of any desired size, such as having, in this example, an overall dimension of 13¾ x 17½ inches and an inside depth of 1⅞ inches. When cover 12 is open, the bed 18 rises about ⅛ inch above the upper edge of the box 10. The effective copy size for the article being photographed is about 10¾ x 17½ inches. The cover has a thickness of 3/16 of an inch and edge portion 12a extends about ½ inch beyond the outside front edge of the box. This overhang of the cover beyond the edge of the box provides a convenient finger leverage for giving a final pressure pinch to the book or other article being photographed just before the cover is finally closed and leveled by the pressure of the operator's hand, thus avoiding apparent motion just before and at the moment of exposure. The result is that the article is always fully flattened, in sharp focus, and at rest at the moment of exposure. Both of the operator's hands are always free to handle the copy, and the nuisance of actuating a floor foot switch is avoided. The copying of the article, as, for example, successive pages of a book, can proceed very rapidly and with minimum fatigue.

Having now described the means by which the objects of the invention are obtained.

We claim:

1. An easel for holding an article to be photographed comprising a box, synthetic plastic elastic foam means in said box, transparent cover means hinged to said box for pressing an article supported by said elastic foam means down into said foam means and holding the upper surface of said article flush against said cover means and in focus with a camera, electrical micro-switch means mounted on the front side of said box, pin plunger means mounted on said cover means for engagement with said switch means for actuating said switch means, and said elastic foam means being extended above the upper edge of said box when said cover means is open to prevent actuation of said switch means before said cover means is completely closed and said pin plunger means actuates said switch means for energizing an electrical circuit to snap the shutter of a camera focused on said article.

2. An easel as in claim 1, said elastic foam means comprising polyurethane plastic foam.

3. An easel as in claim 2, further comprising a front edge portion of said cover means overhanging the front side of said box when said cover is closed.

4. An easel as in claim 3, said switch means being mounted on the front side of said box.

References Cited

UNITED STATES PATENTS

| | | | |
|---|---|---|---|
| 1,463,689 | 7/1923 | Gray | 355—63 |
| 1,702,494 | 2/1929 | Caps | 355—25 |
| 2,545,964 | 3/1951 | Maxwell | 355—76 |
| 3,400,630 | 9/1968 | Carlson | 355—75 |

NORTON ANSHER, Primary Examiner

W. A. SIVERTSON, Assistant Examiner

U.S. Cl. X.R.

355—75